United States Patent
Rose et al.

(10) Patent No.: US 6,661,263 B2
(45) Date of Patent: Dec. 9, 2003

(54) VOLTAGE SEQUENCING ARRANGEMENTS PROVIDING FIRST AND SECOND VOLTAGES SEQUENCED TO EACH OTHER IN TIME

(75) Inventors: Bruce W. Rose, Aloha, OR (US); Michael A. Stapleton, Portland, OR (US); Jeffrey J. Olsen, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/745,413

(22) Filed: Dec. 26, 2000

(65) Prior Publication Data

US 2002/0079950 A1 Jun. 27, 2002

(51) Int. Cl.[7] .................................................. H03K 4/06
(52) U.S. Cl. ........................................ 327/134; 327/131
(58) Field of Search ................................ 327/131, 132, 327/133, 134, 325, 337

(56) References Cited

U.S. PATENT DOCUMENTS

| | | | | |
|---|---|---|---|---|
| 3,970,872 A | * | 7/1976 | Kuhn et al. | 327/100 |
| 4,413,237 A | * | 11/1983 | Baba | 327/131 |
| 5,019,754 A | * | 5/1991 | Onozawa et al. | 315/408 |
| 5,434,527 A | * | 7/1995 | Antone | 327/391 |
| 5,528,043 A | * | 6/1996 | Spivey et al. | 250/370.09 |
| 5,777,503 A | * | 7/1998 | Faulk | 327/323 |
| 5,852,377 A | * | 12/1998 | Pitsch | 327/143 |
| 5,910,744 A | * | 6/1999 | Watarai | 327/163 |
| 5,926,042 A | * | 7/1999 | Talaga, Jr. | 327/45 |
| 6,181,173 B1 | * | 1/2001 | Homol et al. | 327/143 |
| 2002/0175770 A1 | * | 11/2002 | Cyrusian | 331/17 |

\* cited by examiner

*Primary Examiner*—Terry D. Cunningham
(74) *Attorney, Agent, or Firm*—LeMoine Patent Services, PLLC

(57) ABSTRACT

A voltage sequencer includes an input terminal and an output terminal and a control element connected between the input an output terminals. A capacitive element is connected between the output terminal and a first voltage and a resistive element is connected between the output terminal and a second voltage. The control element selectively controls charging and discharging of the capacitive element such that, upon the voltage at the input terminal increasing from the first voltage to a nominal value, the output terminal voltage increases to a nominal value in a first predetermined period of time and upon the voltage at the input terminal decreasing from the nominal value to the first voltage, the output terminal voltage decreases to the first voltage value in a second predetermined period of time, the first predetermined period of time being different from, for example, substantially greater than, the second predetermined period of time. The capacitive element may be a capacitor and the resistive element may be a resistor. The first voltage may be a ground potential while the second voltage may be a positive potential with respect to the first voltage.

14 Claims, 2 Drawing Sheets

VOLTAGE SEQUENCING ARRANGEMENTS PROVIDING FIRST AND SECOND VOLTAGES SEQUENCED TO EACH OTHER IN TIME

FIELD

The present invention relates to voltage sequencing and more particularly to a voltage sequencing arrangement for use with or in integrated circuits.

BACKGROUND

There are many instances in which a voltage sequencing arrangement is needed. Quite often, it is necessary for an integrated circuit or an electronic system to have two or more power supply voltages having different rising and falling edge delay requirements. That is, for example, an integrated circuit component may require a first power supply voltage and a second power supply voltage, the turn on of the second power supply voltage being delayed by a first time delay from the turn on of the first power supply voltage and the turn off of the second power supply voltage being delayed by a much shorter second time delay so as to be virtually simultaneous with that of the first power supply voltage.

One example of such a voltage sequencing requirement is that of a processor, such as a CPU (Central Processing Unit) integrated circuit. Many present-day processors are packaged so as to have the identical configuration and pin arrangement irrespective of their design voltage. That is, a processor designated for use in a laptop computer may use a lower power supply voltage than that of a processor designated for use in a desktop computer, even though the two processors are functionally identical in operation.

In order to avoid accidentally providing the wrong power supply voltage to such processors, many processors today are manufactured with VID (Voltage Identification) pins, typically four pins, which provide an output to a voltage regulator which supplies power to the processor. The VID output indicates to the voltage regulator what voltage is required by the processor. This ensures that the correct power supply voltage is automatically provided to the processor. However, upon initially providing a first power supply voltage to the processor, the VID output is unstable since it is in a transient state. Accordingly, it is necessary to provide a second voltage which is delayed from the first power supply voltage to the voltage regulator which indicates to the voltage regulator that the VID output is now stable and can be used to select the proper regulated power supply voltage supplied by the regulator to the processor. Furthermore, upon the first power supply voltage being turned off, the VID output is once again unstable since it is in a transient state and accordingly, it is necessary to turn off the second voltage without any additional delay so as to immediately have the voltage regulator turn off the regulated power supply voltage that it is supplying to the processor.

BRIEF DESCRIPTION OF THE DRAWINGS

The foregoing and a better understanding of the present invention will become apparent from the following detail description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figures 1, 2:
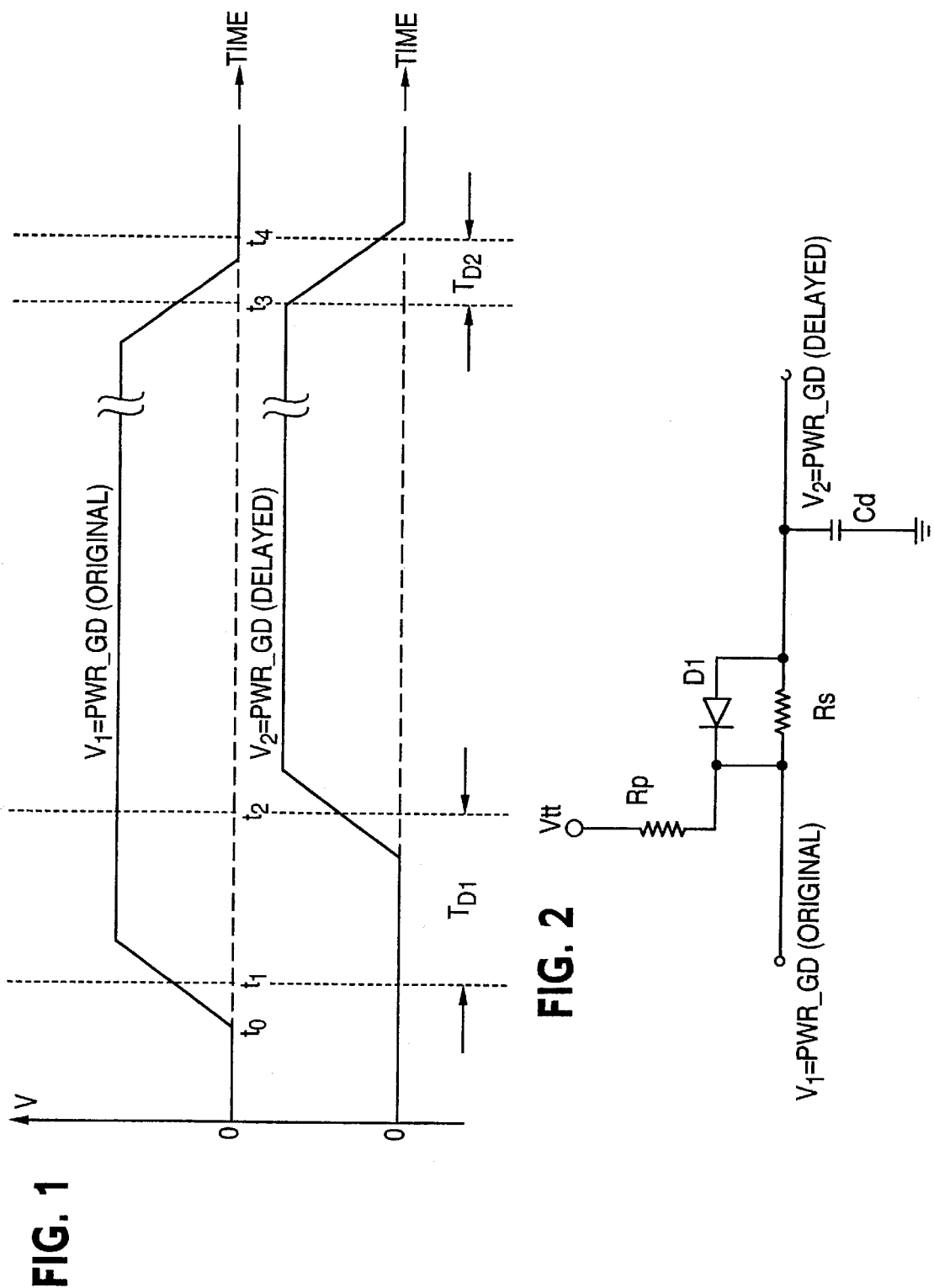
FIG. 1 illustrates voltage waveforms for use in explaining an example embodiment of the present invention.
FIG. 2 illustrates an example embodiment in accordance with the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, clock signals and timing signals are not draw to scale and instead, exemplary and critical time values are mentioned when appropriate. With regard to description of any timing signals, the terms assertion and negation may be used in an intended generic sense. Lastly, well-known power connections and other components may not be shown within the drawing figures for simplicity of illustration and discussion and so as not to obscure the invention.

As noted previously, processors, for example, require a first voltage and a second voltage which is delayed from the first voltage upon turn on of the first voltage, the second voltage being quickly turned off upon the first voltage being turned off.

FIG. 1 illustrates a first voltage, V1, labelled PWR_GD (ORIGINAL), and a second voltage V2, labelled PWR_GD (DELAYED). As illustrated in FIG. 1, the voltage V1 increases from 0 volts at time t0 to its nominal value, reaching a first predetermined percentage of its nominal value at a time t1. The voltage V1 then remains at its nominal value until a later time in which it decreases to 0 volts, reaching a second predetermined percentage of its nominal value at a time t3. Note that the first and second predetermined percentages may either be the same or different, depending on the application.

Further referring to FIG. 1, the voltage V2 increases from 0 volts to its nominal value, reaching a third predetermined percentage of its nominal value at a time t2, the time delay between time t1 and time t2 being labelled TD1. The voltage V2 then remains at its nominal value until later time in which it decreases to 0 volts, reaching a fourth predetermined percentage of its nominal value at a time t4, the time delay between time t3 and time t4 being labelled TD2. As with voltage V1, the third and fourth predetermined percentages may be either the same or different, depending on the application.

With regard to example values, the first and second predetermined percentages may both be 70 percent while the third and fourth predetermined percentages may be 70 and 30 percent. The time delay TD1 may, for example, be at least one millisecond while the time delay TD2 may be substantially equal to 0 as compared to time delay TD1, that is, microseconds or nanoseconds rather than milliseconds.

FIG. 2 illustrates one example embodiment of the present invention. As illustrated in FIG. 2, the terminal V1 is connected to resistor Rs. The terminal V1 is normally an open collector or drain such that initially, prior to time t0, the terminal V1 is grounded while after time t0, the terminal V1 is floating. A diode D1 is connected across the resistor Rs and the terminal V2 is connected to the junction of the resistor Rs and a capacitor Cd, the other terminal of the capacitor Cd being grounded. A resistor Rp is connected between the terminal V1 and a power source Vtt. The value of the resistor Rs may, for example, be one or two hundred ohms while the value of the resistor Rp may be several thousand ohms.

In operation, the terminal V1 is short circuited to ground until time t0. At that time, terminal V1 is left floating. Accordingly, as illustrated in FIG. 1, the voltage at terminal V1 increases to its nominal value. The diode D1 is back biased after time t0 since the voltage at terminal V2 is initially 0. By adjusting the values of the two resistors and the capacitor, the voltage at terminal V2 can rise to its nominal value by the charging of the capacitor Cd through the series combination of the two resistors Rs and Rp, the much larger value of the resistor Rp essentially making the effects of the smaller resistor Rs negligible. That is, the charging time constant can be adjusted so that a delay TD1 occurs between the terminal V1 reaching a first predetermined percentage of its nominal value and the terminal V2 reaching a third predetermined percentage of its nominal value. Note that the V2 waveform shown in FIG. 1 has linear rise times and fall times. However, the rise times and fall times are in fact exponential due to the charging and discharging of the capacitor Cd.

Upon turn off, terminal V1 is essentially short circuited to ground. Accordingly, all of the charge on capacitor Cd is very quickly removed through the diode D1 which is now forward biased. Since the resistance of the forward-biased diode D1 is extremely small, for example, a few ohms, the discharge time constant becomes orders of magnitude faster than the charge time constant, such that the turn off time TD2 at the terminal V2 is negligible as compared with the turn on time TD1.

It is to be noted that the capacitance value of capacitor Cd must be relatively small, for example, on the order of a thousand picofarad. Otherwise, a relatively large amount of energy stored in the capacitor Cd would have to be dissipated by the diode D1 and the short circuited gate or collector connected to terminal V1.

Figure 3:
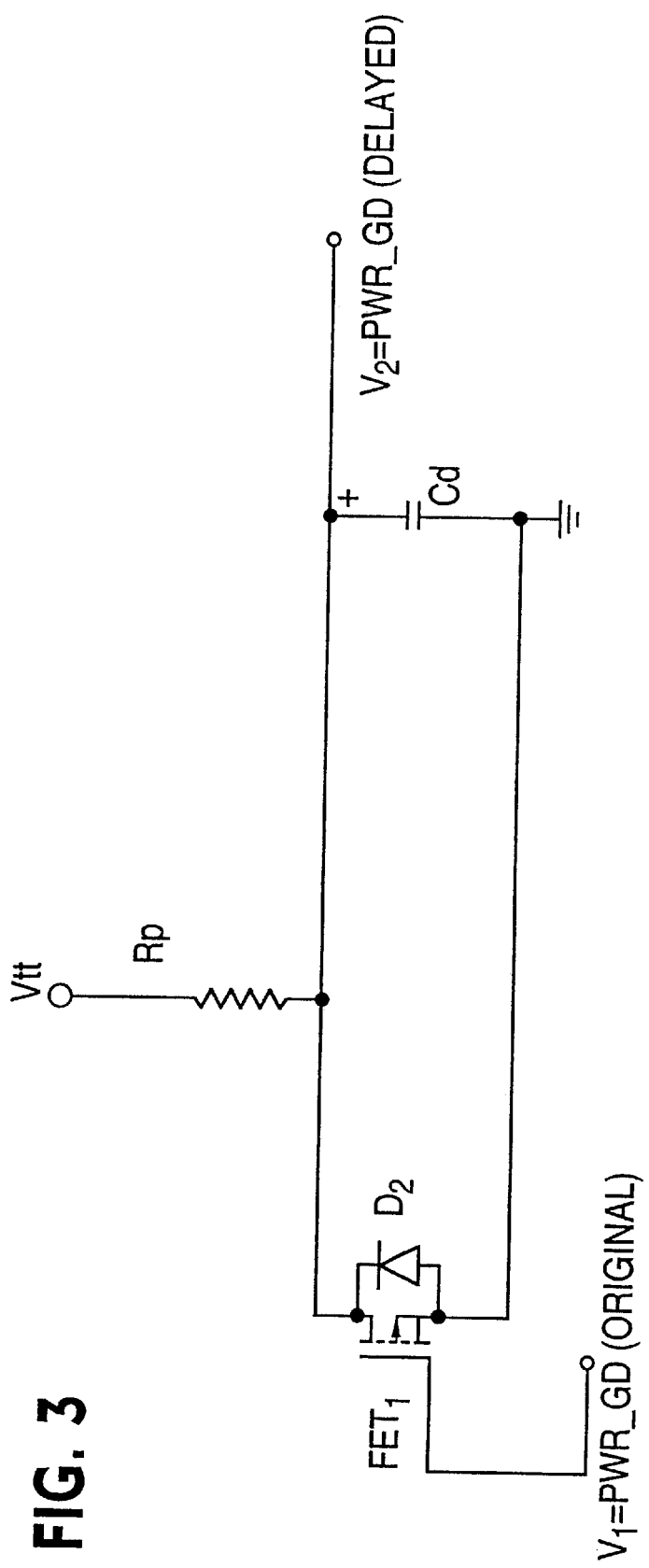
FIG. 3 illustrates another example embodiment in accordance with the present invention.

FIG. 3 illustrates another example embodiment in accordance with the present invention. In FIG. 3, the terminal V1 is connected to the gate of a FET (Field Effect Transistor) FET1. The source and drain of FET1 are connected to respective terminals of capacitor Cd. An additional element, such as a resistor connected to a voltage source (not shown), may be connected to the terminal V1 to provide suitable voltage levels at the gate of FET1 to insure its proper operation. The embodiment of FIG. 3 operates in the same fashion as the embodiment of FIG. 2 with the exception that the energy stored in the capacitor Cd is dissipated by FET1 when it is turned on by the voltage at terminal V1. Since the resistance value of resistor Rp is chosen to be much greater than the on resistance of turned on FET1, the delay time TD2 is substantially less than the delay time TD1 so as to be negligible. Diode D2 is optionally added to prevent negative voltage transients.

This concludes the description of the example embodiments. Although the present invention has been described with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

For example, the present invention is not limited to the use of a FET but rather any gated device, such as a bipolar transistor, may be used to dissipate the energy stored in the capacitor providing that the time necessary to dissipate the energy stored in the capacitor is negligible in comparison to the time necessary to initially accumulate the energy in the capacitor. Furthermore, while resistors and capacitors have been shown in the drawing figures, other functionally equivalent active devices may be used.

What is claimed is:

1. A voltage sequencer apparatus comprising an input terminal and an output terminal, a control element connected between said input and output terminals, a capacitive element connected between said output terminal and a first voltage, and a resistive element connected between said output terminal and a second voltage, wherein said control element selectively controls charging and discharging of said capacitive element such that, upon input terminal voltage increasing from said first voltage to a nominal value, said output terminal voltage increases to a nominal value in a first predetermined period of time and wherein, upon input terminal voltage decreasing from said nominal value to said first voltage, said output terminal voltage decreases to said first voltage in a second predetermined period of time, said first predetermined period of time being different from said second predetermined period of time; and a voltage regulator controllable by at least said output terminal voltage.

2. The apparatus of claim 1, said capacitive element comprising a capacitor.

3. The apparatus of claim 1, said resistive element comprising a resistor.

4. The apparatus of claim 1, said first voltage comprising a ground potential.

5. The apparatus of claim 1, said second voltage comprising a positive potential with respect to said first voltage.

6. The apparatus of claim 1, said first predetermined period of time being substantially greater than said second period of time.

7. A voltage sequenced system comprising:

an integrated circuit including a voltage sequencer portion having an input terminal and an output terminal, a control element connected between said input and output terminals, a capacitive element connected between said output terminal and a first voltage, and a resistive element connected between said output terminal and a second voltage, wherein said control element selectively controls charging and discharging of said capacitive element such that, upon input terminal voltage increasing from said first voltage to a nominal value, said output terminal voltage increases to a nominal value in a first predetermined period of time and wherein, upon input terminal voltage decreasing from said nominal value to said first voltage, said output terminal voltage decreases to said first voltage in a second predetermined period of time, said first predetermined period of time being different from said second predetermined period of time; and a voltage regular controllable by at least said output terminal voltage.

8. The system of claim 7, capacitive element comprising a capacitor.

9. The system of claim 7, said resistive element comprising a resistor.

10. The system of claim 7, said first voltage comprising a ground potential.

11. The system of claim 7, said second voltage comprising a positive potential with respect to said first voltage.

12. The system of claim 7, said first predetermined period of time being substantially greater than said second period of time.

13. The system of claim 7, said integrated circuit being a processor.

14. The system of claim 7, said at least one device being a voltage regulator.

* * * * *

UNITED STATES PATENT AND TRADEMARK OFFICE
CERTIFICATE OF CORRECTION

PATENT NO.     : 6,661,263 B2
DATED          : December 9, 2003
INVENTOR(S)    : Bruce W. Rose, Michael A. Stapleton and Jeffrey J. Olsen It is certified that error appears in the above-identified patent and that said Letters Patent is hereby corrected as shown below:

<u>Title page,</u>
Item [57], ABSTRACT,
Line 3, delete "an" and insert -- and --, therefor.

<u>Column 5,</u>
Line 3, insert -- said -- before "capacitive".

Signed and Sealed this

Sixth Day of April, 2004

JON W. DUDAS
*Acting Director of the United States Patent and Trademark Office*